United States Patent [19]

Alexander

[11] 4,049,127

[45] Sept. 20, 1977

[54] HANGING FILE FOLDER SUPPORT FRAME

[75] Inventor: Robert L. Alexander, Erlanger, Ky.

[73] Assignee: Hunt Manufacturing Co., Philadelphia, Pa.

[21] Appl. No.: 718,561

[22] Filed: Aug. 30, 1976

[51] Int. Cl.² ............................................. A47F 5/10
[52] U.S. Cl. .................................. 211/189; 211/184; 312/184; 403/234
[58] Field of Search ................. 211/182, 183, 189, 45, 211/46, 118; 312/184, 183; 403/172, 217, 176, 225, 223, 234, 235, 237, 192; 46/29

[56] References Cited

U.S. PATENT DOCUMENTS

| 2,871,861 | 2/1959 | Posner | 211/189 X |
| 3,295,697 | 1/1967 | Patterson | 211/184 |
| 3,651,950 | 3/1972 | Carter | 211/189 |
| 3,860,119 | 1/1975 | Irvine et al. | 211/45 |

FOREIGN PATENT DOCUMENTS

| 765,510 | 6/1934 | France | 312/184 |
| 791,837 | 3/1958 | United Kingdom | 312/184 |

Primary Examiner—Roy D. Frazier
Assistant Examiner—Robert W. Gibson, Jr.
Attorney, Agent, or Firm—Smith, Harding, Earley & Follmer

[57] ABSTRACT

A hanging file support frame has a pair of file folder support rails and a pair of transverse members. Four corner fittings supported in an elevated position each have a substantially vertical slot receiving one end of a rail and a substantially horizontal slot receiving one end of a transverse member. Each transverse member overlies both rails to prevent the upward movement of the rails.

9 Claims, 5 Drawing Figures

HANGING FILE FOLDER SUPPORT FRAME

BACKGROUND OF THE Invention

Hanging file folder support frames are well known to the art as seen, for example, in U.S. Pat. No. 3,860,119 and in the patents cited therein. It is known to mount the support rails in substantially vertical slots in the corner fittings as disclosed in my U.S. patent application Ser. No. 607,346 filed Aug. 25, 1975 and in vertical slots formed in the transverse members as shown in U.S. Pat. No. 3,651,950. It is also known to have a tongue at each end of each transverse member passing through a slot in the adjacent support rail and corner fitting to secure the rail against vertical movement as shown in U.S. Pat. No. 3,860,119 and in Kirk C. Kirkorian U.S. patent application Ser. No. 596,075 filed July 15, 1975.

This invention provides a unique hanging file folder support frame in that the transverse members overlie the support rails and are, in turn, received in horizontal slots in the corner fittings to prevent the upward movement of both the transverse members and the support rails. Further the transverse members may be constructed in accordance with the invention to encompass the corner fittings in such a manner that they cannot be moved transversely away from the fittings as they can be in the structure of U.S. Pat. No. 3,860,119. The arrangement is such that transverse, longitudinal and upward movement of the rails and transverse members during normal use is prevented.

BRIEF SUMMARY OF THE INVENTION

A hanging file support frame has a pair of file folder support rails and a pair of transverse members. Four corner fittings supported in an elevated position each have a substantially vertical slot receiving one end of a rail and a substantially horizontal slot receiving one end of a transverse member. Each transverse member overlies both rails to prevent the upward movement of the rails. Advantageously the end of each transverse member has an opening with the portions of the transverse member bordering said opening being received in a substantially horizontal slot extending about the adjacent corner fitting.

DETAILED DESCRIPTION

Figure 1:
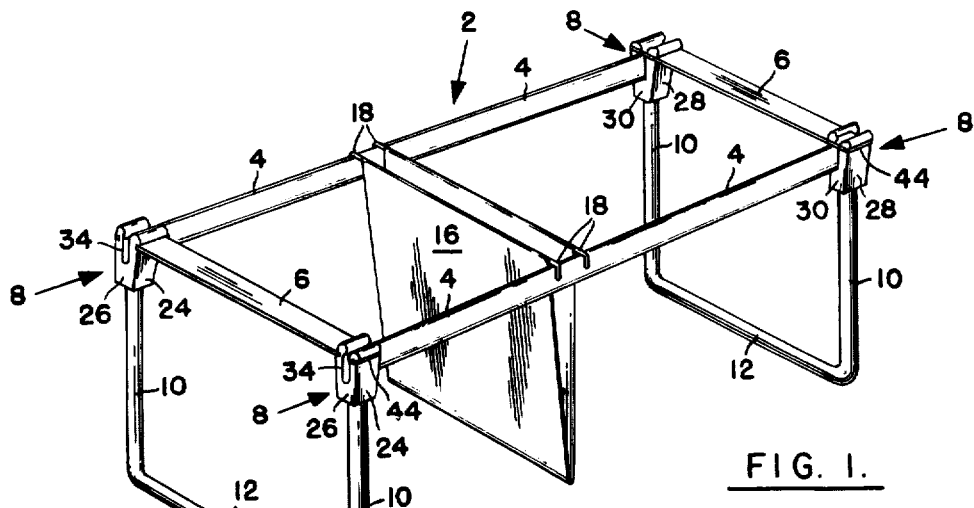
FIG. 1 is a side perspective view of a hanging file folder support frame in accordance with the invention.

A hanging file folder support frame 2 in accordance with the invention has a pair of file folder support rails 4,4 and a pair of transverse members 6,6. Support rails 4 and transverse members 6 are supported by four corner fittings 8 each mounted on an upstanding leg 10 of an end support member 12. As shown in FIG. 1, the support rails 4,4 are adapted to support file folders such as the file folder 16 having sliders 18 which are adapted to slide along rails 4,4.

Figure 2:
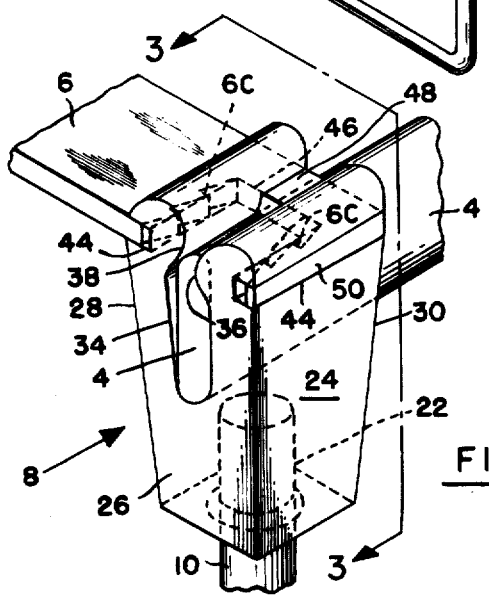
FIG. 2 is a side perspective view, partially broken away, of the right front corner fitting and associated elements.
Figure 3:
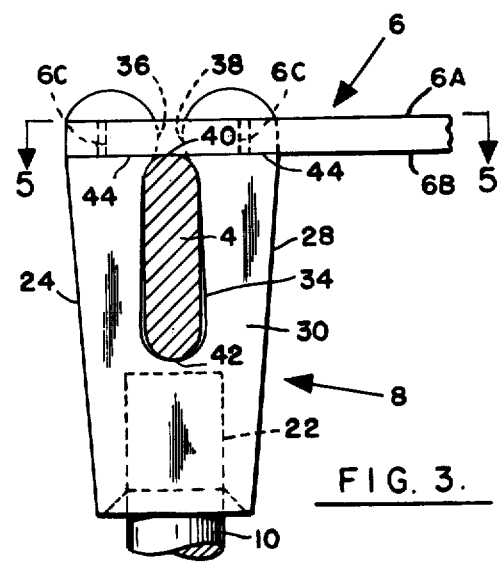
FIG. 3 is a vertical section, partially broken away, taken on the plane indicated by the line 3—3 in FIG. 2.

Referring now to FIG. 2, each corner fitting 8 has a bottom opening 22 receiving a leg 10 in a pressed fit. Fitting 8 has faces 24, 26, 28 and 30 which taper inwardly from their tops to their bottoms. A vertical slot 34 tapers inwardly from its bottom towards its top and has a reduced entrance portion, advantageously about 50% of the width of a support rail 4, formed by arcuate portions 36 and 38 of the fitting 8. Slot 34 receives one end of a rail 4 in a pressed fit. The upper end 40 and the lower end 42 of rail 4 are rounded so that either end can be readily forced through the rounded portions 36 and 38 which will flex outwardly sufficiently to permit the downward passage of rail 4.

Figure 4:
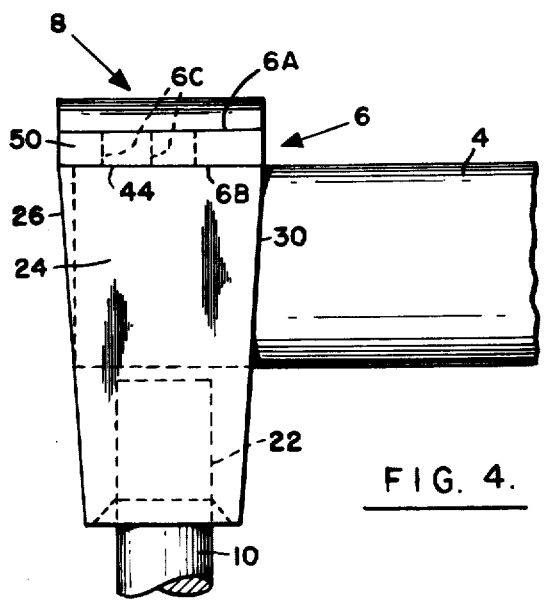
FIG. 4 is a side elevation, partially broken away, of the corner fitting of FIG. 2 and associated elements.
Figure 5:
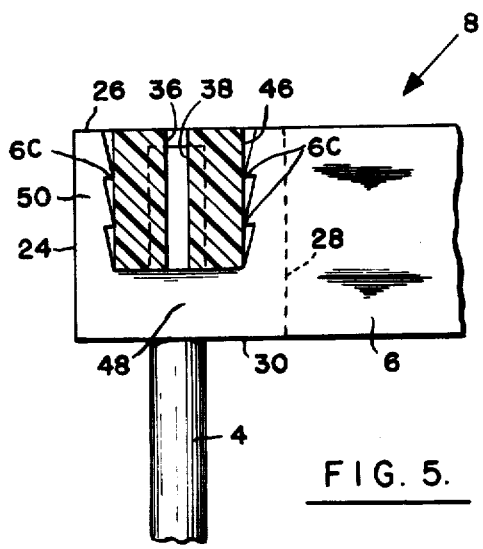
FIG. 5 is a horizontal section, partially broken away, taken on the plane indicated by the line 5—5 in FIG. 3.

A horizontal slot 44 extends across the upper portions of faces 24, 30 and 28. Each transverse member end has an opening 46. The portions of transverse member 6 bordering opening 46 are received in slot 44. The main body portion of transverse member 6 is received in the portion of slot 44 in face 28. The leg portion 48 is received in the portion of slot 44 in face 30 and the right angle leg portion 50 is received in the portion of slot 44 in face 24. While the top 6A and bottom 6B of each transverse member 6 may be parallel, it is preferred to have them taper slightly inwardly from right to left as shown in FIG. 4 which illustrates a metal transverse member 6 and a resilient plastic fitting 8. This facilitates the entry of member 6 into slot 44. Alternatively the slot 44 may be correspondingly tapered or both the member 6 and slot 44 may be tapered. While not essential, it is preferred to provide member 6 with a roughened surface to resist the withdrawal of member 6 from slot 44. Advantageously the roughened surface takes the form of teeth 6C which engage fitting 8 within slot 44 and are arranged to resist the withdrawal of member 6 from slot 44 as shown in FIGS. 2 and 5.

Preferably the corner fittings 8 are constructed from a resilient synthetic resin, for example, a polyamide resin, for example, nylon, or an acetal resin such as DELRIN sold by E. I. Du Pont de Nemours & Co., Inc., Wilmington, Del. Other materials conventionally used to form support frames can be used. Thus, a metal such as aluminum is satisfactory. The remaining parts are preferably made of metal such as steel or aluminum.

In assembling file folder support frame 2 the corner fittings 8 are telescoped over the upper ends of legs 10 of end support members 12. Each end of the rails 4,4 is then forced downward to force arcuate portions 36 and 38 of the adjacent fitting 8 to spread apart and permit the rail end to enter the adjacent slot 34 in which it is tightly held by the upper portions of the walls thereof to prevent longitudinal movement of the rail. Each end of the transverse members 6,6 is now entered into slot 44 of the adjacent fitting 8 which locks the rail 4 to the corner fitting in a position overlying the adjacent rail and prevents upward movement of the rail as well as preventing upward and transverse movement of the transverse member. The assembly operation is both simple and quick.

It will be understood that the above described embodiment is illustrative and is not intended to be limiting.

I claim:

1. A hanging file folder support frame comprising:
    a pair of file folder support rails,
    a pair of transverse members,
    four corner fittings each having a substantially vertical slot receiving one end of a rail and having an entrance at the top thereof for the passage of a rail into the slot and a substantially horizontal slot receiving one end of a transverse member and securing it against upward movement.

each transverse member overlying both rails to prevent the upward movement of the rails, and a leg supporting each corner fitting.

2. A frame in accordance with claim 1 in which a reduced end portion of each transverse member overlies the adjacent rail and is received in the horizontal slot.

3. A frame in accordance with claim 2 having an extension extending at a right angle from the reduced end portion and received in the substantially horizontal slot.

4. A frame in accordance with claim 1 in which each end of each transverse member has an opening and the horizontal slot of the corner fitting extends around the fitting and receives therein portions of the transverse member adjacent the opening to hold the transverse member against vertical movement and movement in the direction of its length.

5. A frame in accordance with claim 1 in which the entrance to the substantially vertical slot is reduced and is smaller in width than the thickness of the rail.

6. A frame in accordance with claim 4 in which at least a part of the portions of the transverse member adjacent said opening is roughened.

7. A frame in accordance with claim 4 in which each transverse member is tapered to facilitate entry into the slots.

8. A frame in accordance with claim 4 in which each slot is tapered to facilitate the entry of the adjacent transverse member.

9. A frame in accordance with claim 6 in which the roughening comprises teeth arranged to resist the withdrawal of the transverse member from the horizontal slot.

* * * * *